United States Patent Office 3,429,680
Patented Feb. 25, 1969

3,429,680
STEAM REFORMING OF HYDROCARBONS
Isaburo Watanabe, Haruo Yoshioka, and Seiji Sanga, Tokyo, Shohachi Egashira, Sagamihara-shi, and Taketo Ohki, Tokyo, Japan, assignors to Japan Gasoline Company, Limited, and Nikki Chemical Company, Limited, Tokyo, Japan, both corporations of Japan
Filed Oct. 15, 1964, Ser. No. 404,131
Claims priority application Japan, Oct. 15, 1963, 38/55,304; Mar. 18, 1964, 39/14,940
U.S. Cl. 48—214      23 Claims
Int. Cl. C07c 3/34

---

ABSTRACT OF THE DISCLOSURE

A process for steam reforming a hydrocarbon having a boiling point of 220° C. or lower, in which the hydrocarbon is contacted in the presence of steam at an elevated temperature within the range of about 200° C. to 1000° C. and at a pressure within the range of about 0 to 50 atmospheres gauge, with a catalyst comprising a mixture of (a) from 5 to 50% by weight, calculated as nickel, of a nickel component, (b) an effective amount but less than 10% by weight, calculated as the metals and with the percentage being based on the weight of nickel, of a promotive component selected from the group consisting of copper-chromium oxides and copper-chromium-manganese oxides, and (c) an inorganic oxide support material serving as a carrier for both the nickel component and the promotive component.

---

This invention relates to a process for the steam reforming of hydrocarbons and particularly to a process for the steam reforming of hydrocarbons, such as liquefied petroleum gases and petroleum naphtha fractions, in the presence of a novel catalyst composition to produce gases suitable for chemical syntheses or combustion and to reduce carbon deposition on the catalyst bed.

It has been known that the steam reforming of hydrocarbons can be efficiently utilized for the production of gaseous products useful for synthesizing ammonia or methanol and also hydrogen gas or fuel gas. The conventional steam reforming process employs a nickel catalyst supported on refractory material. A process employing a nickel catalyst can be preformed successfully with light saturated hydrocarbon feeds, such as natural gas, at a temperature above about 750° C. and at a low pressure below several atmospheres. However, the steam reforming process involves a disadvantage in that carbon deposits on the catalyst particles which makes it difficult to continue the steady long run of the process unit because of a lessening of the catalyst activity and an increase of the pressure drop across the catalyst bed.

It is recognized that the carbon deposition increases considerably with an increase of the molecular weight and the amount of unsaturation of the feed hydrocarbons and with an increase of the reaction pressure. Furthermore, the nickel steam-reforming catalyst has an inherent disadvantage of low sulfur resistance. Consequently, the hydrocarbon feeds must be carefully desulfurized so that only a trace of sulfur remains prior to the steam reforming.

The present inventors have discovered that the catalyst composition hereinafter described has an unexpectedly high steam reforming activity and a high sulfur resistance. A steam reforming process employing this catalyst can be efficiently conducted with various kinds of hydrocarbon feeds over an extended range of reaction conditions for a long period of continuous operation with remarkably reduced carbon deposition as compared with the conventional steam reforming process. Moreover, the presence of hydrogen added into the reaction zone accelerates the steam reforming of hydrocarbons effected by the new catalyst, particularly at relatively low reaction temperatures.

An object of this invention is to provide an improved process for the steam reforming of hydrocarbons employing a novel catalyst composition of superior catalytic properties, which process can be efficiently performed with various types of hydrocarbon feeds and which reduces the amount of carbon deposition.

Another object is to provide an improved process for producing a gaseous mixture containing appreciable amounts of methane from hydrocarbon feeds by the reaction of hydrocarbons and steam in the presence of a novel catalyst.

Still another object is to provide an improved method of preparing a catalyst composition suitable for use in a hydrocarbon, steam-reforming process.

In accordance with the present invention, there is provided a process for steam reforming hydrocarbons which comprises reacting one or more hydrocarbons boiling below about 220° C. with steam, the steam ratio being between one and seven moles of steam per atom of carbon in the reactant hydrocarbons, at temperatures within the range of 200° to 1000° C. and pressures within the range of 0 to 50 atmospheres gauge in the presence of a catalyst comprising from 5% to 50% by weight of nickel in the form of metallic nickel and/or its oxide, not more than 10% by weight, based on the weight of said metallic nickel, of a promotive component selected from the group consisting of copper-chromium and copper-chromium-manganese in the form of the oxide and the balance comprising an inorganic oxide support material.

It should be noted that the term "steam reforming of hydrocarbons" or derivatives used in this description and claims includes reacting hydrocarbons with steam and carbon dioxide, as well as with steam alone according to the ordinary definition thereof. The weight percentages of the nickel and promotive component are calculated on the basis of the metal unless otherwise specifically mentioned. The steam ratio is defined as moles of steam charged per atom of carbon in the reactant hydrocarbons and the space velocity is defined at the total volume, at normal temperature and pressure conditions of all reactants charged in one hour per volume of the catalyst.

The catalyst employed in the present process contains 5% to 50% by weight, preferably 10% to 30% by weight, of nickel which is present in the form of the pure metal and/or its oxide. The promoting component selected from the group consisting of copper-chromium and copper-chromium-manganese is present in a quantity of not more than 10% by weight, particularly 5% to 10% by weight, which percentage is based on the weight of nickel, and is present in the form of oxides in the catalyst. The copper-chromium promoting component may comprise of one mole of copper per approximately one mole of chromium and the copper-chromium-manganese component may comprise one mole of copper per approximately one mole of chromium per approximately 0.1 mole of manganese. The promotive component may be preferably added to the composition containing nickel either as a complex salt of copper-chromium or copper-chromium-manganese or as the oxide obtained by decomposition thereof. The co-existence of the promotive component with nickel in the catalyst improves remarkably the catalytic activity of steam reforming reaction and the capability of reducing carbon deposition during the steam reforming. Moreover, the catalyst containing nickel and the promotive component has higher sulfur resistance as compared with an ordinary nickel catalyst. These advantageous effects will be described hereinafter by referring to illustrative examples.

The inorganic oxide support material may be selected from any of the usual types of materials suitable for the support of steam reforming catalysts. For instance, natural or synthetic inorganic oxide materials containing silica, alumina, magnesia and/or calcium oxide are suitable for use in the catalyst of this invention. Kieselguhr may be satisfactorily used as the support material of the catalyst in the lower temperature steam reforming procedures and alumina-silica-calcium oxide refractory may be used in higher temperature procedures.

Furthermore, the present inventors have recognized that the addition of alkali metal compounds and/or alkaline earth metal compounds to the catalyst composition referred to hereinabove brings about even further improvements in the activity of the catalyst and in the reduction of carbon deposition. The alkali metal compound may be preferably contained in the catalyst in a quantity of not more than 5% by weight and the alkaline earth metal compound in a quantity of not more than 30% by weight. The alkali metal and alkaline earth metal compounds may be utilized in combination or separately in this invention. Potassium is the particularly preferred alkali metal and is suitably applied in the form of a solution of potassium carbonate which is impregnated into the catalyst composition. Magnesium is preferably used as the alkaline earth metal and it is suitably added as magnesium oxide after the stage of the precipitation of nickel compounds in the catalyst manufacture. Of course, other alkali metals and alkaline earth metals can be successfully used and the method of addition thereof is not essential in this invention.

Referring to the drawings.

Figure 1:
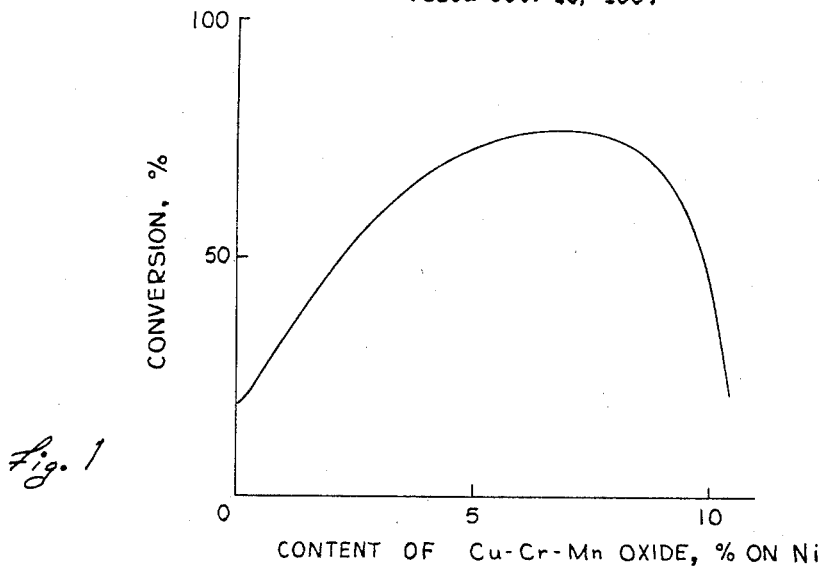
FIGURE 1 is a graph showing the effect on the conversion percentage, in a steam reforming process, of adding a copper-chromium-manganese complex to a nickel catalyst.

FIGURE 1 shows the effect of the addition of copper-chromium-manganese oxide to a supported nickel catalyst. A low temperature of 300° C. was used for the steam reforming of a butane feed in order to clarify the effect of the promotive component. As is obvious from FIGURE 1, the conversion percentage using the catalyst of the present invention was more than two times higher than that using a nickel catalyst. This means that the present catalyst has a much higher reforming activity than the nickel catalyst and, consequently, the steam reforming process employing the present catalyst is operable with much reduced carbon deposition.

The promotive component above mentioned also improves the sulfur resistance of the nickel catalyst. A nickel catalyst composition containing 8%, based on the weight of nickel, of copper-chromium-maganese was used in an experiment in which the steam reforming of a butane fraction which contained 40 p.p.m. (as sulfur) of sulfur compounds was carried out. The conversion percentage slightly and gradually decreased from a rate of 1.0 at the start to 0.95 at 12 hours later, and 0.83 at 120 hours later. The above results, however, indicate a good resistance to sulfur compounds because the usual nickel catalyst is rapidly deactivated by even low amounts of sulfur compounds contained in the reactants. It is significant to note that no carbon deposition was observed after the experiment was completed. Although the results are not tabulated here, the results of experiments by the inventors indicate that the use of copper-chromium oxide realize effects similar to those achieved by the copper-chromium-manganese oxide referred to above.

It has never been recognized by others that the promotive component specified hereinabove improves the catalytic properties of a nickel catalyst to such a great extent.

Figure 2:
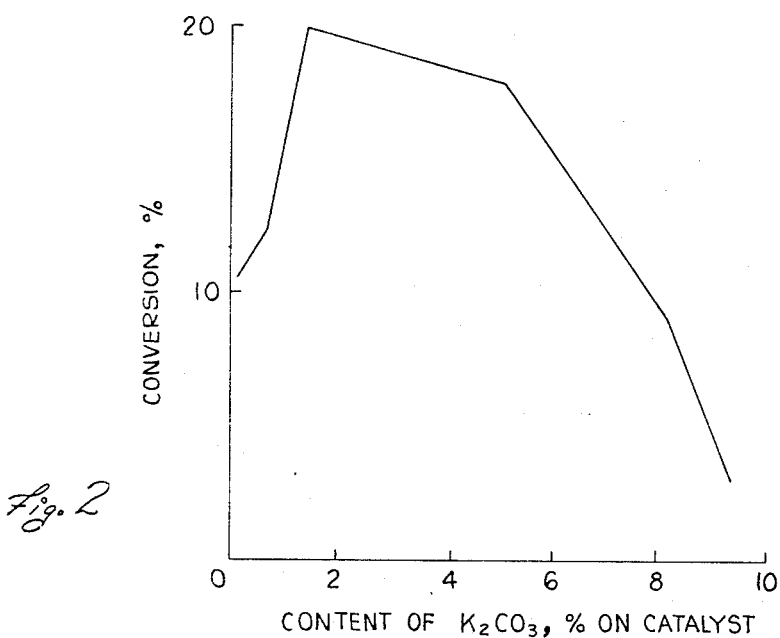
FIGURE 2 is a similar graph showing the effect of adding potassium carbonate to a catalyst according to the present invention.

FIGURE 2 illustrates the effect of the addition of potassium carbonate as an alkali metal compound to the new catalyst, for example, a catalyst containing 45% nickel and 3.6% copper-chromium-manganese. The steam reforming reaction was conducted at 300° C. and at a space velocity of 25,000 v./v./hr. in order to maintain the conversion percentage at a relatively low level. The conversion percentage was almost doubled by the addition of the potassium carbonate in amounts not exceeding about 5%. It is understood that the catalytic activity is greatly improved and this leads to a reduction of carbon deposition. An alkaline earth metal compound, for example magnesium oxide, produced the same effects when added in amounts not exceeding 30%.

The catalyst composition may be prepared by the precipitation, impregnation or mixing methods, or combinations thereof, and it may be used in any of the usual catalyst shapes, such a granules, pellets, beads, extrusions, and microspheres. In consideration of the contact efficiency of reactants, the pressure drop through catalyst bed and the convenience of catalyst preparation, solid or hollow cylinders are particularly suitable for commercial use.

For instance, the catalyst composition may be prepared by mixing a precipitate of nickel compounds readily decomposable to the oxide by heating, for example, a nickel carbonate precipitate, which precipitate is deposited on an inorganic oxide support material, for example kieselguhr, with a complex salt of the promotive component readily decomposable to the oxide by heating, for example the ammonium complex salt thereof, or with the oxide of the promotive component obtained by the decomposition of the complex salt thereof. The resultant composition is shaped to appropriate form, for example, hollow cylinders. The shaped composition is heated in an oxygen containing gas stream, for example, an air stream, at elevated temperatures, for example at 200° to 400° C., to effect the decomposition of active ingredients and then in a reducing gas stream, for example, in a hydrogen stream, at elevated temperatures, for example 350° to 500° C., for the reduction of the active ingredients. Further, the caatlyst composition thus prepared may advantageously be subjected to a stabilization treatment in an oxidative atmosphere, for example in an air-nitrogen stream, at appropriate temperatures, for example 100° to 200° C. in order to form a supply of commercial catalyst composition.

The thus preliminarily reduced and stabilized catalyst composition contains considerable amounts of active metallic nickel therein and hence it is readily activated by the reduction treatment at relatively low temperatures and it has an excellent catalytic activity. An alkali metal compound may be impregnated in the catalyst composition thus obtained from an aqueous solution thereof, for example a potassium carbonate solution. An alkaline earth metal compound may be added as the oxide, for example magnesium oxide, to the mixture of nickel precipitate on the support and the promotive component prior to shaping. An alumina-silica-calcium oxide refractory may be combined with the catalyst composition prepared by the above procedure in an appropriate quantity, for example one part of the refractory to one part of the above catalyst composition, in order to give the finished catalyst composition higher heat resistance. The catalyst composition may be subjected to a reduction treatment for the final activation thereof before it is used for the steam reforming.

The above-mentioned procedure of catalyst preparation provides the finished catalyst with substantial advantages such as the readiness for reduction for final activation thereof, the complete realization of the desired catalytic properties and the safe handling thereof. However, this invention is not limited to the particular procedures referred to above.

The temperature employed in the present steam reforming process is in the range of 200° to 1000° C. and may be varied depending on the product qualities. The temperature range is noticeably greater than that of conventional processes due to the higher activity of the catalyst. The relatively low reaction temperatures, such as below 650°

C., may be suitably applied for the production of gases containing predominantly methane, hydrogen and carbon dioxide, which are especially suitable for town gas because of low carbon monoxide content. The relatively high reaction temperatures are employed for the production of gases containing mainly hydrogen and carbon monoxide. In the process according to the invention, with higher molecular weight hydrocarbon feeds, a temperature profile different from the conventional processes may be advantageously applied.

That is, a lower temperature may be employed in the inlet portion of the reaction zone and a higher temperature may be employed in the outlet portion thereof. For instance, when the process is performed in a tubular furnace, the inlet temperature of the reaction tubes is maintained at 300° to 700° C. and the outlet temperature at 700° to 950° C. Such a temperature profile minimizes appreciably carbon deposition in the preheating zone and on the catalyst particles which makes it possible to achieve the long production runs of the process unit.

The present steam reforming process is performed at pressures of 0 to 50 atmospheres gauge, preferably 0 to 30 atmospheres, and at steam ratios in the range of one to seven moles of steam per atom of carbon in the reactant hydrocarbon. The steam ratio may be varied depending on the reaction conditions, the properties of the hydrocarbon feeds and the desired composition of the product gases.

Generally speaking, a higher steam ratio is required with heavier, unsaturated hydrocarbon feeds at higher reaction pressures. For the production of a methane containing gas at below 650° C., a steam ratio below five moles of steam per atom of carbon in the reactant hydrocarbon can be used satisfactorily.

The inventors have found that the introduction of hydrogen into the reaction zone increases the reaction rate and decreases the tendency of carbon deposition particularly at the lower reaction temperatures in the present steam reforming process. For the purposes of this invention, any hydrogen containing gas may be satisfactorily used, preferably in an amount of approximately one mole or more of hydrogen per mole of hydrocarbon feed.

The hydrocarbons suitable for this process include liquefied petroleum gases and petroleum naphthas boiling below 220° C. Furthermore, this process, if desired, may be used to process other hydrocarbon containing materials; for example, natural gases, petroleum refinery off gases, coal tar light oils and the like. The hydrocarbons may contain certain amounts of unsaturated hydrocarbons and sulfur compounds.

The present steam reforming process may be advantageously conducted in a tubular furnace although other types of hydrocarbon gasification units may be used for this purpose.

In accordance with a modification of the steam reforming process using a naptha feed at lower reaction temperatures, a hydrocarbon fraction rich in aromatic compounds may be produced simultaneously with the gaseous products mentioned hereinbefore. This is accomplished by operating this process so as to leave a portion of the charged naphtha not gasified during the steam reforming reaction and recovering the residual liquid products by cooling the effluent stream from the reaction zone to ambient temperature. The liquid products thus obtained are enriched with aromatic hydrocarbons and may be charged to aromatic separation process units for recovery of pure aromatic hydrocarbons.

This invention will be further described by reference to the following examples.

EXAMPLE 1

The catalyst employed in this example was prepared as follows: 100 g. of nickel carbonate precipitate, deposited on kieselguhr and containing about 43 g. of nickel was mixed with 6 g. of an ammonium complex salt of copper, chromium and manganese which was prepared in a mole ratio of Cu:Cr:Mn=1:1:0.1. The mixture was pelleted and heated at 380° C. in an air stream for decomposition and then at 380° to 400° C. in hydrogen stream for reduction. The catalyst had the following composition before the reduction:

|  | Percent |
|---|---|
| NiO | 54.5 |
| CuO | 2.5 |
| $Cr_2O_3$ | 2.5 |
| MnO | 0.3 |
| $SiO_2$ | 40.2 |

Steam reforming was carried out on various hydrocarbons, namely a butane fraction containing 89.3% butanes, 9.0% propane and 1.7% ethane, a pure cyclohexane fraction, a pure benzene fraction, and an olefin containing hydrocarbon gas containing 0.8% methane, 1.6% ethane, 9.1% ethylene, 8.3% propane, 0% propylene, 30.2% i-butane and 49.9% n-butane.

The reaction conditions and the results are shown in the following table:

| Feeds | I | II | III | IV |
|---|---|---|---|---|
|  | Butane | Cyclohexane | Benzene | Olefin Contg. Gas |
| Reaction Conditions: |  |  |  |  |
| Temperature, °C | 300 | 310 | 325 | 250 |
| Pressure, kg./cm.² gauge | 5.0 | 0 | 0 | 0 |
| Steam Ratio, moles/atom | 2 | 2 | 2.3 | 2 |
| Space Velocity, v./v./hr | 5,500 | 2,020 | 800 | 3,600 |
| Analyses of Products: |  |  |  |  |
| $H_2$, vol. percent (Dry Basis) | 7.5 | 25.5 | 33.1 | 14.2 |
| CO, vol. percent (Dry Basis) | 0 | 0.1 | 0.8 | 0 |
| $CO_2$, vol. percent (Dry Basis) | 18.5 | 23.5 | 32.4 | 19.1 |
| $CH_4$, vol. percent (Dry Basis) | 73.9 | 51.1 | 33.3 | 63.8 |
| $C_2$-$C_4$ Hydrocarbons, vol. percent (Dry Basis) | 0.1 | 0 | 0.5 | 2.9 |
| $C_5$+ vol. percent (Dry Basis) | 0 | 0 | 0 | 0 |
| Carbon Deposit | None | None | None | None |

It is obvious from the above table that the present steam reforming process carries out at almost perfect conversion at lower temperatures with no carbon deposit, even with unsaturated hydrocarbons.

EXAMPLE 2

The catalyst in Example 1 was further subjected to a stabilization treatment by heating it in an air-nitrogen stream at 150° C. and then impregnating it with a solution of potassium carbonate to obtain a catalyst composition containing about 3.5% of potassium carbonate in the final composition.

The resultant catalyst was applied to the steam reforming of a naphtha fraction which had a specific gravity of 0.706 and a boiling range of 38–145° C.

|  | I | II |
|---|---|---|
| Reaction Conditions: |  |  |
| Temperature, °C | 350 | 400 |
| Pressure, kg./cm.² gauge | 5 | 5 |
| Steam Ratio, moles/atom | 2.9 | 2.9 |
| Space Velocity, v./v./hr | 1,260 | 1,300 |
| Analyses of Products: |  |  |
| $H_2$, vol. percent (Dry Basis) | 28.7 | 21.0 |
| CO, vol. percent (Dry Basis) | 0.0 | 0.2 |
| $CO_2$, vol. percent (Dry Basis) | 22.4 | 21.0 |
| $CH_4$, vol. percent (Dry Basis) | 47.2 | 57.5 |
| $C_2H_6$, vol. percent (Dry Basis) | 1.1 | 0.3 |
| $C_3H_8$, vol. percent (Dry Basis) | 0.4 | 0.0 |
| $C_4H_{10}$, vol. percent (Dry basis) | 0.2 | 0.0 |
| Carbon Deposit | None | None |

EXAMPLE 3

The catalyst in this example was prepared as follows: 1 kg. of nickel carbonate, precipitated on kieselguhr and containing about 430 g. of nickel was mixed with 60 g. of an ammonium complex salt of copper, chromium and manganese which was prepared in a mole ratio of Cu:Cr:Mn=1:1:0.1. The resultant mixture was pelleted and heated at 380° C. in an air stream for decomposition and then at 380° to 400° C. in hydrogen stream for reduction, and thereafter was subjected to the stabilization treatment. After pulverization of the resultant composition, 1 kg. of the powder (below 150 mesh) was then mixed with 1.2 kg. of powder of an alumina-silica-calcium oxide refractory and a solution of 20 g. of potassium carbonate dissolved in 600 cc. of water, and was formed to 16 x 13 mm. pillars by a tableting machine and finally was dried.

The catalyst thus prepared had the following composition:

|  | Percent |
|---|---|
| NiO | 25.8 |
| $Cr_2O_3$ | 1.2 |
| CuO | 1.2 |
| MnO | 0.1 |
| $Al_2O_3$ | 29.4 |
| CaO | 17.6 |
| $K_2CO_3$ | 1.2 |
| $SiO_2$ | 23.5 |

The steam reforming process of this invention was performed with a petroleum naphtha fraction which boils in the range of 39.8° to 147° C. and contains 65 vol. percent of paraffins, 30 vol. percent of naphthenes and 5 vol. percent of aromatics, using the catalyst above mentioned. The reaction conditions and the results are shown in the following table:

|  | I | II |
|---|---|---|
| Reaction Conditions: |  |  |
| Inlet Temperature at Reaction Zone, °C | 500 | 500 |
| Outlet Temperature at Reaction Zone, °C | 800 | 800 |
| Pressure, kg./cm.² gauge | 15 | 10 |
| Steam Ratio, moles/atom | 5 | 5 |
| Space Velocity, v./v./hr | 2,000 | 2,000 |
| Analyses of Products: |  |  |
| $H_2$, vol. percent (Dry Basis) | 70.3 | 72.3 |
| CO, vol. percent (Dry Basis) | 11.9 | 11.8 |
| $CO_2$, vol. percent (Dry Basis) | 15.8 | 14.8 |
| $CH_4$, vol. percent (Dry Basis) | 2.0 | 1.1 |
| $C_2$+hydrocarbons, vol. percent (Dry Basis) | 0 | 0 |
| Carbon Deposit | None | None |

EXAMPLE 4

In this example, different temperatures were used for the steam reforming using the catalyst of Example 3. The same naphtha fraction as in Example 3 was used.

The reaction conditions and the results were as follows:

|  | I | II |
|---|---|---|
| Reaction Conditions: |  |  |
| Temperature, °C | 400 | 550 |
| Pressure, kg./cm.² gauge | 10 | 5 |
| Steam Ratio, moles/atom | 1.4 | 3 |
| Space Velocity, v./v./hr | 687 | 6,400 |
| Analyses of Products: |  |  |
| $H_2$, vol. percent (Dry Basis) | 9.4 | 52.6 |
| CO, vol. percent (Dry Basis) | 0.1 | 2.7 |
| $CO_2$, vol. percent (Dry Basis) | 22.2 | 20.2 |
| $CH_4$, vol. percent (Dry Basis) | 68.4 | 24.5 |
| $C_2$+Hydrocarbons vol. percent (Dry Basis) | 0 | 0 |
| Carbon Deposit | None | None |

EXAMPLE 5

In this example, the catalyst of Example 3 was compared with a nickel catalyst to determine the steam reforming activity and the capability of depressing carbon deposit. A butane fraction was used as hydrocarbon feed.

The nickel catalyst composition was prepared by mixing uniformly precipitates of basic nickel carbonate with kaolin in such a proportion that the final catalyst composition contained 35% NiO, drying the mixture, pelleting it with graphite and finally calcining at 1250° C.

|  | I | II |
|---|---|---|
| Catalyst | Catalyst According to Example 3 | Nickel Catalyst |
| Reaction Conditions: |  |  |
| Inlet Temperature at Reaction Zone, °C | 500 | 500 |
| Outlet Temperature at Reaction Zone, °C | 800 | 800 |
| Pressure, kg./cm.² gauge | 0 | 0 |
| Steam Ratio, moles/atom | 5 | 5 |
| Space Velocity, v./v./hr | 3,000 | 3,000 |
| Analyses of Products: |  |  |
| $H_2$, vol. percent (Dry Basis) | 74.1 | 70.7 |
| CO, vol. percent (Dry Basis) | 12.6 | 15.2 |
| $CO_2$, vol. percent (Dry Basis) | 12.9 | 13.5 |
| $CH_4$, vol. percent (Dry Basis) | 0.4 | 0.6 |
| $C_2$+Hydrocarbons, vol. percent (Dry Basis) | 0 | 0 |
| Carbon Deposit at 1½ hrs. later, wt. percent | 0 | 1.2 |

EXAMPLE 6

A catalyst composition containing about 10% of magnesium oxide was prepared by adding magnesia to the mixture of nickel carbonate precipitate on kieselguhr and ammonium complex salt of copper, chromium and manganese prior to shaping in the manufacture of catalyst in Example 3. The composition of catalyst thus prepared is as follows:

| | Percent |
|---|---|
| NiO | 21.3 |
| $Cr_2O_3$ | 1.0 |
| CuO | 1.0 |
| MnO | 0.1 |
| $Al_2O_3$ | 26.8 |
| CaO | 20.4 |
| $K_2CO_3$ | 0.8 |
| MgO | 10.2 |
| $SiO_2$ | 18.4 |

The same naphtha fraction as in Example 3 was used in this example.

Reaction conditions:
Inlet temperature at reaction zone, ° C. ____ 500
Outlet temperature at reaction zone, ° C. ____ 750
Pressure, kg./cm.² gauge _____ 20
Steam ratio, moles/atom _____ 6.2
Space velocity, v./v./hr. _____ 2460

Analyses of products, vol. percent (dry basis):
$H_2$ _____ 69.5
CO _____ 8.1
$CO_2$ _____ 18.0
$CH_4$ _____ 4.4
$C_2$+hydrocarbons _____ 0
Carbon deposit _____ None

EXAMPLE 7

In this example, a catalyst of relatively low concentration of active components was used.

The catalyst had the following composition:

| | Percent |
|---|---|
| NiO | 6.36 |
| $Cr_2O_3$ | 0.3 |
| CuO | 0.3 |
| MnO | 0.03 |
| $Al_2O_3$ | 47.9 |
| CaO | 36.3 |
| $K_2CO_3$ | 0.24 |
| MgO | 3.07 |
| $SiO_2$ | 5.5 |

The reaction conditions and the results are shown in the following table.

The same butane fraction as in Example 1 was used in this example.

Reaction conditions:
Inlet temperature at reaction zone, ° C. _____ 500
Outlet temperature at reaction zone, ° C. ____ 800
Pressure kg./cm.² gauge _____ 0
Steam, ratio, moles/atom _____ 5
Space velocity, v./v./hr. _____ 3000

Analyses of products, vol. percent (dry basis):
$H_2$ _____ 73.7
CO _____ 12.3
$CO_2$ _____ 13.4
$CH_4$ _____ 0.6
$C_2$+hydrocarbons _____ 0.0
Carbon deposit _____ None

EXAMPLE 8

The same catalyst as in Example 3 except that the promotive component did not employ manganese. The composition was as follows:

| | Percent |
|---|---|
| NiO | 25.8 |
| $Cr_2O_3$ | 1.2 |
| CuO | 1.2 |
| $Al_2O_3$ | 29.5 |
| CaO | 17.6 |
| $K_2CO_3$ | 1.2 |
| $SiO_2$ | 23.5 |

Hydrocarbon feed was the same as in Example 3.

Reaction conditions:
Temperature, ° C. _____ 700
Pressure, kg./cm.² gauge _____ 5
Steam ratio, moles/atom _____ 5
Space velocity, v./v./hr. _____ 3000

Analyses of products, vol. percent (dry basis):
$H_2$ _____ 72.0
CO _____ 8.5
$CO_2$ _____ 17.0
$CH_4$ _____ 2.5
$C_2$+hydrocarbons _____ 0
Carbon deposit _____ None

EXAMPLE 9

In this example, the steam reforming was conducted in the presence of added hydrogen. The catalyst and the butane fraction used in Example 1 were employed.

Reaction conditions:
Temperature, ° C. _____ 200
Pressure, kg./cm.² gauge _____ 0
Steam ratio, moles/atom _____ 2
Hydrogen/hydrocarbon ratio, moles/mole ___ 2
Space velocity, v./v./hr. _____ 2000

Analyses of products, vol. percent (dry basis):
$H_2$ _____ 10.2
CO _____ 0
$CO_2$ _____ 3.2
$CH_4$ _____ 78.1
$C_2$ _____ 1.0
$C_3$ _____ 1.0
$C_4$ _____ 6.5
Carbon deposit _____ None

EXAMPLE 10

A butane fraction the same as that used in Example 1 was reformed with steam in the presence of the catalyst having the following composition:

| | Percent |
|---|---|
| NiO | 58.5 |
| CuO | 1.5 |
| $Cr_2O_3$ | 1.5 |
| MnO | 0.2 |
| $SiO_2$ | 38.3 |

The reaction conditions and the results are shown in the following table.

Reaction conditions:
Temperature, ° C. _____ 300
Pressure, kg./cm.² gauge _____ 0
Steam ratio, moles/atom _____ 2
Space velocity, v./v./hr. _____ 3000

Analyses of products, vol. percent (dry basis):
$H_2$ _____ 26.8
CO _____ 0
$CO_2$ _____ 16.2
$CH_4$ _____ 34.7
$C_2H_6$ _____ 0.2
$C_3H_8$ _____ 0.4
i-$C_4H_{10}$ _____ 2.7
n-$C_4H_{10}$ _____ 19.0
Carbon deposit _____ None

EXAMPLE 11

A catalyst containing 20% of magnesium oxide was employed, which had the following composition:

| | Percent |
|---|---|
| NiO | 45.0 |
| $Cr_2O_3$ | 2.0 |
| CuO | 2.0 |
| MnO | 0.2 |
| $K_2CO_3$ | 2.0 |
| MgO | 20.0 |
| $SiO_2$ | 28.8 |

The same naphtha fraction as used in Example 3 was used in this example.

The reaction conditions and the results are shown in the following table.

Reaction conditions:
    Temperature, ° C. _____ 500
    Pressure, kg./cm.² gauge _____ 10
    Steam ratio, moles/atom _____ 2
    Space velocity, v./v./hr. _____ 10,000
Analyses of products, vol. percent (dry basis):
    $H_2$ _____ 31.5
    CO _____ 1.0
    $CO_2$ _____ 21.0
    $CH_4$ _____ 46.5
    $C_2$+hydrocarbons _____ 0
Carbon deposit _____ None It is to be understood that this invention is not limited to the specific embodiments and examples herein described and presented but that its scope is to be determined solely by the claims appended hereto.

The embodiments of the invention in which an exclusive property or privilege is claimed are defined as follows:

1. A process for steam reforming a hydrocarbon fraction having a boiling point of 220° C. or below, which comprises contacting said fraction in the presence of steam at an elevated temperature within the range of about 200° C. to 1000° C. and at a pressure within the range of about 0 to 50 atmospheres gauge, with a catalyst consisting essentially of a mixture of (a) from 5 to 50% by weight, calculated as nickel, of a nickel component, (b) an effective amount but less than 10% by weight, calculated as the metals and with the percentage being based on the weight of nickel present in the catalyst, of a promotive component selected from the group consisting of copper-chromium oxides and copper-chromium-manganese oxides, and (c) the balance being an inorganic oxide support material as a carrier for both the nickel component and the promotive component.

2. A process according to claim 1 in which the hydrocarbon fraction comprises a liquefied petroleum gas.

3. A process according to claim 1 in which the hydrocarbon fraction comprises a petroleum naphtha.

4. A process according to claim 1 in which the catalyst contains from about 10% to 30% by weight of nickel, in the form of a nickel component selected from the group consisting of metallic nickel and nickel oxide.

5. A process according to claim 1 in which the catalyst contains 5% to 10% by weight, calculated as the metals and the percentage being based on the weight of nickel, of the promotive component.

6. A process according to claim 1 in which the catalyst contains less than about 10% by weight, calculated as the metals and the percentage being based on the weight of the nickel, of copper-chromium in the form of their oxides and the proportion of copper and chromium is one mole of copper per approximately one mole of chromium.

7. A process according to claim 1 in which the catalyst contains not more than about 10% by weight, calculated as the metals and the percentage being based on the weight of the nickel, of copper-chromium-manganese in the form of their oxides and the proportion of copper and chromium and manganese is one mole of copper per approximately one mole of chromium and approximately 0.1 mole of manganese.

8. A process according to claim 1 in which the inorganic oxide support material contains kieselguhr.

9. A process according to claim 1 in which the inorganic oxide support material contains kieselguhr and silica-alumina-calcium oxide refractory.

10. A process for steam reforming a hydrocarbon fraction having a boiling point of 220° C. or below, which comprises contacting said fraction in the presence of steam at an elevated temperature within the range of about 200° C. to 1000° C. and at a pressure within the range of about 0 to 50 atmospheres gauge, with a catalyst consisting essentially of a mixture of (a) from 5 to 50% by weight, calculated as nickel, of a nickel component, (b) an effective amount but less than 10% by weight, calculated as the metals and with the percentage being based on the weight of nickel present in the catalyst, of a promotive component selected from the group consisting of copper-chromium oxides and copper-chromium-manganese oxides, (c) a material selected from the group consisting of not more than 5% by weight of an alkali metal compound and not more than 30% by weight of an alkaline earth metal compound, and (d) the balance being an inorganic oxide support material as a carrier for the nickel component, the promotive component and said member.

11. A process according to claim 10 in which the alkali metal compound is potassium compound added in the form of potassium carbonate.

12. A process according to claim 10 in which the alkaline earth metal compound is magnesium compound added in the form of magnesium oxide.

13. A process according to claim 1 in which the temperature is between 700° to 950° C.

14. A process according to claim 1 in which the temperature at the inlet portion of reaction zone is between 300° and 700° C. and the temperature at the outlet portion of reaction zone is between 700° and 950° C.

15. A process according to claim 1 in which the pressure is from 0 to 30 atmospheres gauge.

16. A process for producing a gaseous mixture containing appreciable amounts of methane which comprises reacting hydrocarbons having two or more carbon atoms and a boiling point below 220° C. with steam, the steam ratio being between one to five moles of steam per atom of carbon in the reactant hydrocarbons, at temperatures within the range of about 200° to 650° C. and pressures within the range of about 0 to 50 atmospheres gauge in the presence of a catalyst consisting essentially of (a) from 5% to 50% by weight, calculated as nickel of a nickel component, (b) an effective amount but less than 10% by weight, calculated as the metals and with the percentage being based on the weight of nickel present in the catalyst, of a promotive component selected from the group consisting of copper-chromium oxides and copper-chromium-manganese oxides, and (c) the balance being an inorganic oxide support material as a carrier for both the nickel component and the promotive component.

17. A process according to claim 16, which is performed in the presence of hydrogen introduced into the reaction zone in an amount of one mole or more of hydrogen per mole of hydrocarbons.

18. A process according to claim 16 in which the temperature is 300° to 550° C.

19. A process for producing a gaseous mixture containing appreciable amounts of methane which comprises reacting hydrocarbons having two or more carbon atoms and a boiling point below 220° C. with steam, the steam ratio being between one to five moles of steam per atom of carbon in the reactant hydrocarbons, at temperatures within the range of about 200° to 650° C. and pressures within the range of about 0 to 50 atmospheres gauge in the presence of a catalyst consisting essentially of (a) from 5 to 50% by weight, calculated as nickel, of a nickel component, (b) an effective amount by less than 10% by weight, calculated as the metals and with the percentage being based on the weight of nickel present in the catalyst, of a promotive component selected from the group consisting of copper-chromium oxides and copper-chromium-manganese oxides, (c) a member selected from the group consisting of not more than 5% by weight of an alkali metal compound and not more than 30% by weight of an alkaline earth metal compound, and (d) the balance being an inorganic oxide support material as a carrier for the nickel component, the promotive component and said member.

20. A method of preparing a catalyst composition suitable for use in the steam reforming of hydrocarbons wherein the catalyst composition comprises (a) from 5% to 50% by weight, calculated as nickel, of a nickel component, (b) an effective amount but less than 10% by weight calculated as the metals and with the percentage being based on the weight of nickel present in the catalyst, of a promotive component selected from the group consisting of copper-chromium oxides and copper-chromium-manganese oxides, and an inorganic oxide support material, which comprises mixing a precipitate of nickel compounds readily decomposable to the oxide by heating, which precipitate is deposited on an inorganic oxide support material, with a complex salt of said promotive component readily decomposable to the oxide by heating, shaping the resultant mixture, and heating in an oxidizing atmosphere at 200° to 400° C. and then in a reducing atmospheres at 350° to 500° C. and thereafter in an oxidizing atmosphere at 100° to 200° C.

21. A method according to claim 20 in which the resultant composition is impregnated with a solution of an alkali metal compound.

22. A method according to claim 20 in which the mixture of a nickel precipitate on support material and a complex salt of promotive component is added with the oxide of an alkaline earth metal prior to shaping.

23. A method according to claim 20 in which the resultant composition is pulverized and mixed with an alumina-silica-calcium oxide refractory and thereafter shaped and dried.

References Cited

UNITED STATES PATENTS

| 1,105,772 | 8/1914 | Hall | 48—214 |
| 1,899,184 | 2/1933 | De Simo. | |
| 1,943,821 | 1/1934 | Hanks et al. | |

FOREIGN PATENTS

| 314,870 | 1/1931 | Great Britain. |
| 1,002,978 | 9/1965 | Great Britain. |

MORRIS O. WOLK, *Primary Examiner.*

R. E. SERWIN, *Assistant Examiner.*

U.S. Cl. X.R.

252—458